United States Patent [19]

Poundstone

[11] 4,419,119
[45] * Dec. 6, 1983

[54] METHOD OF FORMING MULTIFOCAL LENS BLANK

[76] Inventor: William W. Poundstone, 1503 Alderman Dr., Grensboro, N.C. 27408

[*] Notice: The portion of the term of this patent subsequent to Dec. 6, 1997 has been disclaimed.

[21] Appl. No.: 371,794

[22] Filed: Apr. 26, 1982

Related U.S. Application Data

[63] Continuation of Ser. No. 900,259, Apr. 26, 1978, abandoned.

[51] Int. Cl.³ ............... C03B 11/08; C03B 23/22; C03B 7/00
[52] U.S. Cl. .................................. 65/39; 65/41; 65/48; 65/55
[58] Field of Search ............... 65/17, 36, 38, 39, 68, 65/37, 41, 48, 55

[56] References Cited

U.S. PATENT DOCUMENTS

| | | | |
|---|---|---|---|
| 901,576 | 10/1908 | Wilhelm | 65/39 |
| 1,026,182 | 5/1912 | Seymour | 65/39 |
| 1,165,978 | 12/1915 | Kinnear | 65/39 |
| 1,560,168 | 11/1925 | Laabs | 65/39 |
| 2,734,315 | 2/1956 | Poundstone | 65/39 |
| 3,130,029 | 4/1964 | Cala | 65/39 |

FOREIGN PATENT DOCUMENTS

| | | | |
|---|---|---|---|
| 837188 | 6/1960 | United Kingdom | 65/39 |
| 854157 | 11/1960 | United Kingdom | 65/39 |
| 855395 | 11/1960 | United Kingdom | 65/39 |

*Primary Examiner*—Richard V. Fisher

[57] ABSTRACT

A method of producing multifocal lens blanks by fusing a molten glass segment into a pressed countersink of a lens blank when it is being formed in which the pressed countersink is unpolished and into which unpolished and pressed countersink a minor element of a molten glass is fused to form a fused multifocal lens blank and in which the major lens blank has one refractive index and the minor element filling and fused to the convex major lens blank in the pressed, unpolished countersink therein may have a higher refractive index with the countersink being selectively spaced from the lens blank periphery.

4 Claims, 3 Drawing Figures

METHOD OF FORMING MULTIFOCAL LENS BLANK

This is a continuation of application Ser. No. 900,259 filed Apr. 26, 1978, now abandoned.

BACKGROUND AND OBJECTIVES OF THE INVENTION

Previously the commercial practice in forming a fused multifocal lens blank consisted in separately forming the major elements of the blank by grinding and polishing a circular countersink sufficiently large to receive a ground and polished minor element which had been ground and polished on one surface to the contour approximating that of the countersink in the major element. The major and minor polished surfaces opposing each other were combined and heat joined at a fusion temperature compatible with the materials from which the major and minor elements were composed. Problems of air entrapment were experienced in the foregoing procedure resulting in imperfect blanks, and this procedure was time-consuming and costly.

In some present multifocal lens blanks, the perimeter of the segment of the countersink is not always circular and may take the configuration of a semicircle, rectangle or other geometric form. A broad range of geometric shapes makes it difficult, if not economically feasible, to form correspondingly shaped countersinks in the major lens blank by grinding and polishing, and the equally difficult task is experienced with respect to the formation of a cooperating minor element for introduction and cooperation with the specific irregular geometric countersink in the recipient major lens blank. Assembling the polished surfaces of the major and minor blanks opposing each other and then fusing them together has also encountered substantial difficulties and problems.

Another method employed in the formation of a noncircular minor element in a multifocal lens blank is to heat-join the two flat edges of a semicircular-shaped crown glass carrier element and a semicircular-shaped barium glass minor element, and then grind and polish one surface of the assembly to a contour closely approximating that of the circular countersink in the major lens blank. The two polished surfaces are then placed together opposing each other and when fused together, only the minor segment is visible. The foregoing methods of forming heat-joined multifocal lens blanks not only require additional glass pressings but also necessitate extra fusing operations including careful cleansing of the surfaces of the several components to eliminate air entrapment and interfacial bubbles that may be entrapped between the surfaces being fused. The mating surfaces require special treatment in order to avoid liberation of gases during fusion to insure that no impurities or any air entrapment would cause the liberation of gases. Problems with alignment with respect to the major and minor elements of the multifocal lens are ever present during the fusing procedure while continuously endeavoring to avoid the entrapment of air bubbles between the elements.

An initial attempt to overcome many of the problems in the method of forming fused bifocal lens blanks is disclosed in my patent, U.S. Pat. No. 2,734,315, which was assigned to Pittsburgh Plate Glass Company, in which fusion of a minor element of the lens to the major element occurred by depositing molten glass of a suitable composition upon the polished surface of the countersink in the major element without entrapment of air at the fusion interfaces. However, the countersink surfaces were ground and polished surfaces as opposed to the present utilization of pressed and unpolished countersinks in the major lens blanks which countersinks have a broad variation of geometrical configurations that do not lend themselves to grinding and polishing of prior practices.

Therefore, it is an object of the present invention to provide a method of forming a fused multifocal lens blank by first pressing a suitable countersink of the desired geometrical configuration in the major lens blank when it is being formed, and preferably then transferring the heated blank with the pressed countersink while mounted on a suitable lens blank support and maintained at an elevated temperature for positioning of the heated lens blank having the present countersink beneath the discharge orifice of a molten glass dispensing unit to receive into the pressed countersink molten glass of a suitable refractive index to be fused with the lens blank pressed countersink after which the fused composite multifocal lens blank may be subjected to a cooling cycle before annealing to relieve any stresses induced during the fabrication.

Other objects and many of the attendant advantages of this invention will become more readily apparent to those skilled in this art of lens production from the accompanying drawing and detailed description which follows, with the understanding that the claims appended are not to be limited and equivalents are contemplated.

DESCRIPTION OF METHOD FOR FORMING MULTIFOCAL LENS BLANKS

Figure 1:
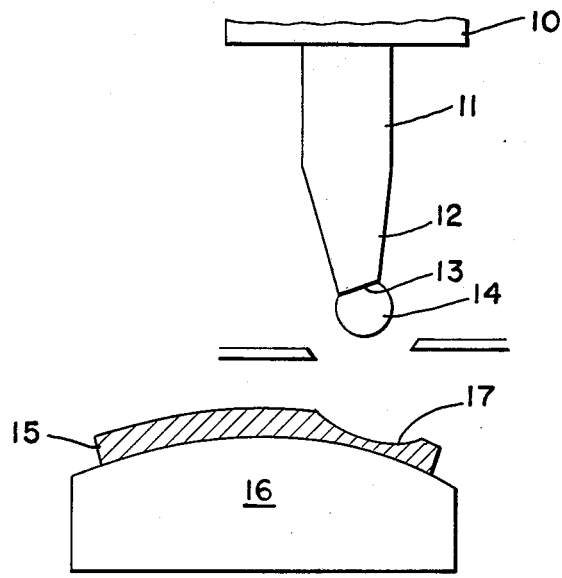
FIG. 1 is a schematic illustration of an arrangement for a glass melting tank having a discharge orifice depending therefrom with a major element lens blank having a pressed countersink supported therebelow to receive molten glass dispensed from the discharge orifice of the glass melting tank.

Referring to the drawing, and specifically to FIG. 1, there is schematically illustrated a glass melting furnace 10 for preparing the minor element of glass which may be of any of the well-known barium or flint types having the appropriate higher indices of refraction than the crown glass of the major lens blank or element and usually has lower temperature softening points. The melting furnace 10 may be of conventional construction and is provided with a depending discharge tube 11 with a converging section 12, which tube and section are generally heated to maintain a uniform predetermined temperature level for the molten glass to be dispensed, with the section 12 terminating with a discharge orifice 13 from which the molten glass is dispensed.

The molten glass from the melting furnace 10 will flow downwardly and be dispensed through the orifice 13 in a stream, only a gob 14 of which is illustrated in FIG. 1.

Figure 2:
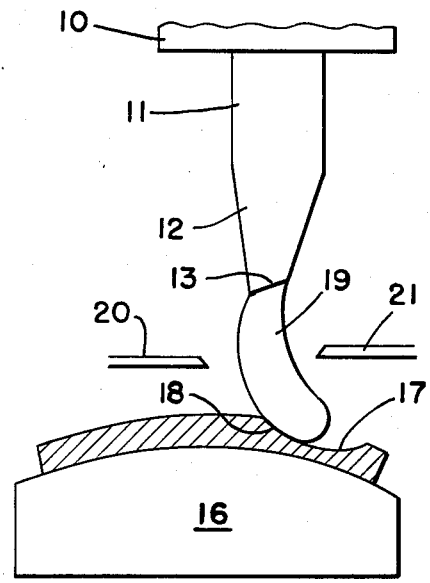
FIG. 2 is a view similar to FIG. 1 to illustrate dispensing of molten glass into the pressed countersink before severance of the molten glass dispensed from the glass melting tank discharge orifice.
Figure 3:
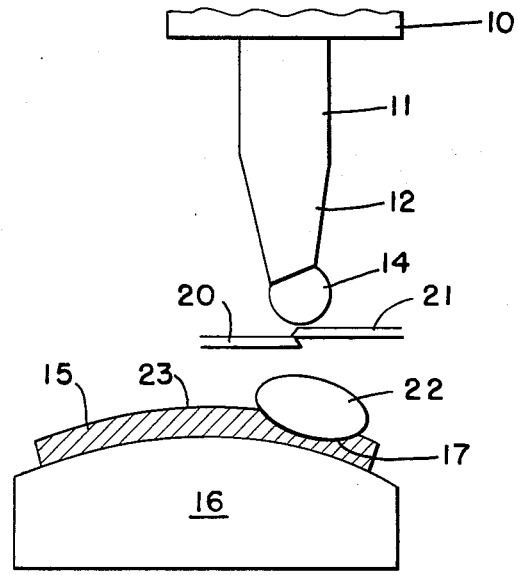
FIG. 3 is a view similar to FIGS. 1 and 2 with the molten glass fused in position in the contoured pressed countersink and the molten glass stream severed.

The preformed multifocal lens blank 15 of the requisite curvature having the desired pressed countersink configuration is positioned on a suitable heat resistant, refractory-type support member 16 which may, while in a heated condition and without reheating, be displaceable on a suitable moving conveyor along a predetermined path of travel from a lens preforming station where the desired curvature and pressed countersink are formed, after which the lens blanks are passed through a preheat lehr for preheat, soak and flash to the molten glass dispensing position shown in FIGS. 1 through 3. The multifocal lens blank or major element 15 has been provided with desired curvature and pressed countersink of the requisite geometric configuration which pressing is preferably accomplished while the lens blank 15 is at an elevated temperature and the contoured countersink tool may be inserted as the lens curvature is formed. Any number of different geometric configurations may be used as a countersink that may not be achieved by grinding and polishing.

The molten gob 14 shown in FIG. 1 is permitted to flow directly into the countersink 17 at the highest elevation 18 enabling the molten glass to flow downwardly into the countersink facilitating deposition of the molten glass into the pressed countersink irrespective of its geometrical contour so as to fill the countersink at least to a minimum level above the major element upper contour. The molten stream 19 shown in FIG. 2 extends from the orifice 13 into the countersink 17 with sufficient excess molten glass for the minor element above the blank 15 to form a protuberance. Fusion will occur without the formation of air bubbles recognizing that the major blank 15 will be maintained at a predetermined suitable elevated temperature without reheating the major blank 15 in which the countersink 17 has been pressed while it is mounted on the refractory support 16 prior to being introduced beneath the orifice 13.

Upon dispensing a predetermined quantity of molten glass 19 through the orifice 13, suitably mounted shears 20 and 21, positioned intermediate the orifice 13 and the major element 15, will be actuated by a suitable mechanism (not shown) to sever the molten glass stream 19, as schematically shown in FIG. 3, to permit the severed molten glass minor element 22 to occupy the countersink 17 to at least overflowing and be fused therein at the junction with at least some excess molten glass protruding above the contour 23 of the major element 15.

It is to be recognized that the flow of molten glass from the furnace orifice 13 that will be intercepted by the shears 20 and 21 will be in a manner as described in the aforementioned U.S. Pat. No. 2,734,315 to eliminate possible shearing scars.

After dispensing the molten glass into the pressed countersink as illustrated in FIG. 3, the support 16, which will preferably be displaced in timed sequence with adjacent assemblies, will be subject to cooling for a predetermined time interval in ambient air before being subjected to an annealing atmosphere to avoid distortion and relieve stresses. Upon removing from the annealing cycle, the multifocal lens blank 15 with the filled countersink may then be further processed as required for specific prescriptions in a conventional manner.

It will be manifest that the relative melting and softening temperatures of the specific major and minor elements will vary depending upon the specific formulations and the objective of avoiding thermal shock which may produce distortion with appropriate heat dissipation being governed by the particular methods which would be apparent to those skilled in the optical lens art.

I claim:

1. A continuous method of forming multifocal lens blanks by flowing and fusing a minor element of molten glass into a pressed and unpolished countersink in the convex surface of a major lens blank to form a fused multifocal lens blank, comprising the steps of pressing a countersink of a preselected geometrical configuration into a major lens blank having the requisite refractive index while said major lens blank is maintained at an elevated temperature, and depositing a molten glass of the desired refractive index in the unpolished pressed countersink of said major lens blank while maintaining said major lens blank at an elevated temperature without reheating said blank to at least fill said countersink whereby the molten glass deposited in the unpolished pressed countersink of the major lens blank will be integrally fused together at least in the countersink preselected configuration.

2. A continuous method of forming multifocal lens blanks as claimed in claim 1, in which said depositing of said molten glass into the unpolished pressed countersink of the major lens blank will cause a flow of the molten glass in a path to eliminate air entrapment within the pressed countersink between the countersink and the deposit of molten glass.

3. A continuous method of forming multifocal lens blanks as claimed in claim 1, including the steps of positioning said contoured major lens blank on a lens blank support, maintaining said major lens blank and lens blank support at an elevated temperature, positioning the lens blank support and major lens blank supported thereon beneath the discharge orifice of a molten glass dispensing unit to receive a deposit of said molten glass into the unpolished pressed countersink of said major lens blank, cooling said combined fused major lens blank in ambient air to avoid distortion and eliminate stresses, and annealing said fused multifocal lens blank.

4. A continuous method of forming multifocal lens blanks as claimed in claim 3, said molten glass being of a higher refractive index than said major lens blank and having a lower temperature of fusion than said major lens blank with said molten glass filling said pressed and unpolished countersink to a level above the adjacent surface of said major lens blank.

* * * * *